H. A. ROAN.
STEERING DEVICE.
APPLICATION FILED OCT. 2, 1919.
1,343,062.
Patented June 8, 1920.
2 SHEETS—SHEET 2.
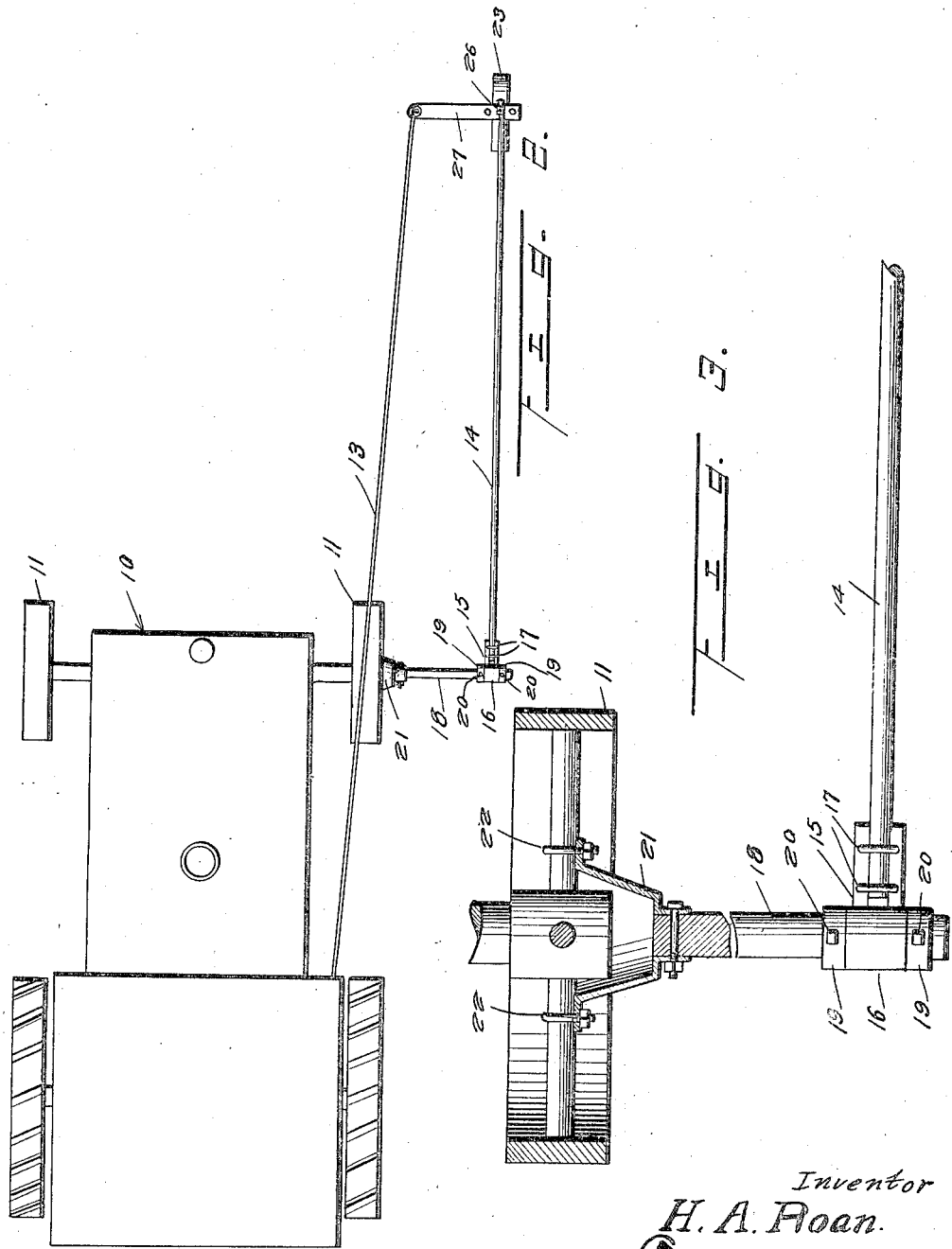
Inventor
H. A. Roan.
By
Attorney

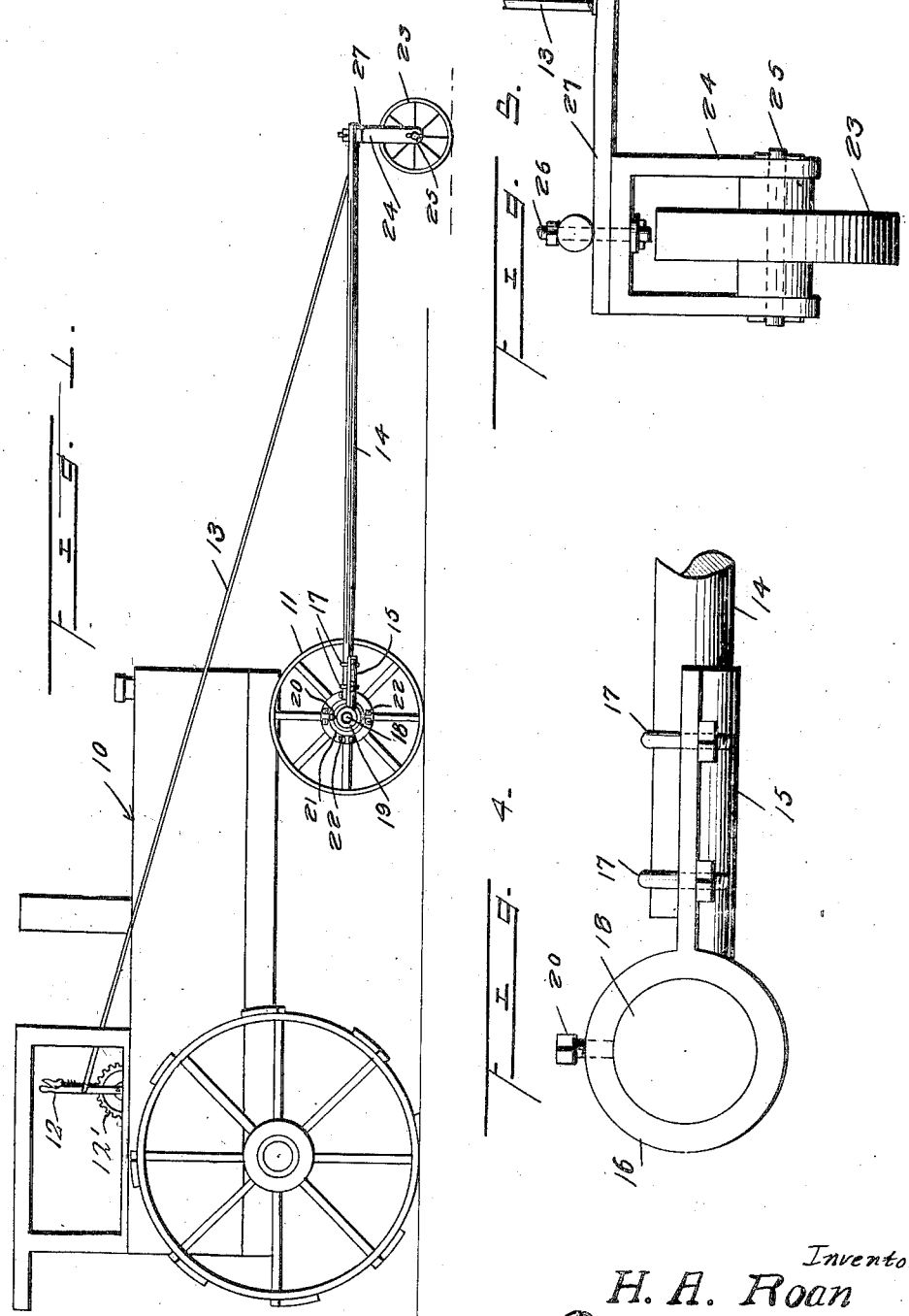

UNITED STATES PATENT OFFICE.

HARRY A. ROAN, OF BROOKING, SASKATCHEWAN, CANADA.

STEERING DEVICE.

1,343,062. Specification of Letters Patent. Patented June 8, 1920.

Application filed October 2, 1919. Serial No. 327,897.

*To all whom it may concern:*

Be it known that I, HARRY A. ROAN, a subject of the King of Great Britain, residing at Brooking, in the Province of Saskatchewan and Dominion of Canada, have invented certain new and useful Improvements in Steering Devices; and I do hereby declare the following to be a full, clear, and exact description of the invention, such as will enable others skilled in the art to which it appertains to make and use the same.

This invention relates to an improved steering device for use in connection with a tractor such as is used upon farms for plowing and the principal object of the invention is to provide a steering attachment so constructed that the tractor may be kept moving in the proper direction while traveling across a field during the plowing operation and thus the ground caused to be plowed properly.

Another object of the invention is to so construct this device that it may be connected with one of the wheels of the front axle and the tractor steered, the attachment including a wheel for traveling in the furrow last formed.

Another object of the invention is to so construct this attachment that it may be connected with any conventional construction of tractor.

Another object of the invention is to so construct this attachment that the wheel carrying lever arm thereof may have vertical movement thus permitting the wheel carried by the lever arm to have proper engagement with the bottom of the furrow.

Another object of the invention is to so construct the attachment that the wheel carrying lever arm may be set the desired distance from the tractor wheel with which the attachment is connected.

Another object of the invention is to so construct the attachment that the wheel thereof may be moved from the cab when it is desired to make a turn at the end of a field.

This invention is illustrated in the accompanying drawings, wherein:

Figure 1 is a side elevation of a conventional construction of tractor with the attachment in place.

Fig. 2 is a top plan view of the tractor provided with the attachment.

Fig. 3 is an enlarged view showing the inner end portion of the attachment connected with the tractor wheel, the view being partially in top plan and partially in section.

Fig. 4 is an enlarged view showing the inner end portion of the wheel carrying lever arm and attaching socket for the same in side elevation.

Fig. 5 is an enlarged view looking at the forward end of the attachment.

This attachment is used in connection with a tractor of a conventional construction shown in Figs. 1 and 2 and indicated by the numeral 10. This tractor is provided with the forward supporting wheels 11 which constitute the guiding wheels. In the cab of this tractor is mounted a latch lever 12 which is positioned in operative relation to the rack 12', thereby permitting the latch lever to be secured in an adjusted position. An actuating rod 13 is connected with this latch lever and extends forwardly as shown for connection with the forward portion of the attachment, as will be hereinafter brought out.

This attachment is provided with a lever arm 14 which has its rear end portion secured in the trough 15 of the bearing 16 through the medium of the clamps 17. This bearing 16 is loosely mounted upon the stub shaft 18 between the abutment collars 19 which are secured in place by set screws 20 and it will thus be seen that the lever arm may have vertical swinging movement. The stub shaft is positioned in alinement with the hub of one of the forward wheels 11 and is connected with this wheel by a cap 21 which fits about the outer end portion of the hub and against the spokes of the wheel and is secured in place by the U-bolts 22 which extend about the spokes. It will thus be seen that the attachment will be securely connected with the wheel 11. A ground wheel 23 is rotatably mounted in the yoke 24 through the medium of the axle 25 and is adapted to travel in a furrow which has previously been formed. The yoke 24 is positioned beneath the forward end portion of the lever arm 14 and connected therewith by a king bolt 26. A lever strip 27 is secured to the yoke 24 and extends beyond one side thereof with its outer end connected with the forward end of the rod 13.

This device is connected as shown in Figs. 1, 2 and 3 and as the tractor moves across a field in plowing the wheel 23 will travel in the furrow last formed. The front axle or guiding axle of the tractor will therefore be held in a position at substantially right angles to the furrow and the tractor will travel parallel to the furrow. By having the bearing 16 loose upon the stub shaft 18, the shaft may rotate with the wheel and further the lever arm 14 may have vertical swinging movement thereby permitting the wheel 23 to follow the bottom of the furrow. When the end of a row is reached and it is desired to turn the tractor, the lever 12 may be moved to swing the yoke 24 through the medium of the rod 13 and lever strip 27 thus permitting the tractor to make the necessary turn. As soon as the turn is made the lever may be released from the rack 12' and the tractor driven to the opposite end of the field with the wheel 23 traveling in the furrow. It will thus be seen that there has been provided a very efficient steering or guiding attachment for a tractor.

What is claimed is:

1. An attachment of the character described comprising a stub shaft, a collar carried by the stub shaft for fitting about the hub of a wheel and against the spokes of a wheel, means for connecting the collar with the spokes of the wheel, a bearing loosely mounted upon the stub shaft, means releasably mounted upon the stub shaft upon opposite sides of the bearing for retaining the same against sliding movement longitudinally upon the stub shaft, a lever arm connected with the bearing, a ground wheel having a yoke pivotally connected with the free end portion of the lever, and means for imparting turning movement to the yoke.

2. An attachment of the character described comprising a stub shaft, a collar carried by the stub shaft for fitting about the hub of a wheel, means for retaining the collar in engagement with the wheel, a lever arm loosely connected with the stub shaft for vertical swinging movement, and a ground wheel having a yoke pivotally connected with the free end portion of the lever arm.

In testimony whereof I affix my signature in presence of two witnesses.

HARRY A. ROAN.

Witnesses:
M. L. M. SKELTON,
I. SMITH.